United States Patent
Wigard et al.

(10) Patent No.: US 12,075,350 B2
(45) Date of Patent: Aug. 27, 2024

(54) NTN COUNTRY AREA SPECIFIC LOW DELAY ACCESS

(71) Applicant: Nokia Technologies Oy, Espoo (FI)

(72) Inventors: Jeroen Wigard, Klarup (DK); Mads Lauridsen, Gistrup (DK); Rafhael Amorim, Aalborg (DK); István Z. Kovács, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 184 days.

(21) Appl. No.: 17/635,364

(22) PCT Filed: Aug. 4, 2020

(86) PCT No.: PCT/EP2020/071847
§ 371 (c)(1),
(2) Date: Feb. 14, 2022

(87) PCT Pub. No.: WO2021/028255
PCT Pub. Date: Feb. 18, 2021

(65) Prior Publication Data
US 2022/0279437 A1    Sep. 1, 2022

Related U.S. Application Data

(60) Provisional application No. 62/887,420, filed on Aug. 15, 2019.

(51) Int. Cl.
*H04W 48/20* (2009.01)
*H04W 4/029* (2018.01)
(Continued)

(52) U.S. Cl.
CPC .......... *H04W 48/20* (2013.01); *H04W 4/029* (2018.02); *H04W 48/18* (2013.01); *H04W 74/0833* (2013.01)

(58) Field of Classification Search
CPC ............................. H04W 64/00; H04L 51/222
(Continued)

(56) References Cited

U.S. PATENT DOCUMENTS

| 2011/0112765 A1* | 5/2011 | Lai | G01S 19/252 |
| | | | 701/469 |
| 2015/0012214 A1* | 1/2015 | Geelen | C09B 29/106 |
| | | | 701/532 |

(Continued)

OTHER PUBLICATIONS

3rd Generation Partnership Project; Technical Specification Group Services and System Aspects; Functional stage 2 description of Location Services (LCS); (Release 14), 3GPP TS 23.271 v14.2.0 (Jun. 2017) (183 pages).

(Continued)

*Primary Examiner* — Kiet M Doan
(74) *Attorney, Agent, or Firm* — Lippes Mathias LLP

(57) ABSTRACT

Methods and apparatus, including computer program products, are provided for non-terrestrial networks. In some example embodiment, there may be provided a method including determining, based on position information, a country where the apparatus is located; receiving, from a non-terrestrial base station, a system information broadcast including mapping information, the mapping information including a country area identifier or a random access radio network temporary identifier; mapping the determined country into the received country area identifier or the received random access radio network temporary identifier; and performing, based on the received country area identifier or the received random access radio network temporary identifier, a random access procedure with the non-terrestrial base station.

16 Claims, 7 Drawing Sheets

(51) Int. Cl.
*H04W 48/18* (2009.01)
*H04W 74/0833* (2024.01)

(58) Field of Classification Search
USPC .............................. 455/456.1, 432.1, 435.1
See application file for complete search history.

(56) References Cited

U.S. PATENT DOCUMENTS

2015/0279113 A1* 10/2015 Knorr ..................... G06T 7/11
345/633
2021/0266981 A1* 8/2021 Wei ...................... H04W 72/04

OTHER PUBLICATIONS

3rd Generation Partnership Project; Technical Specification Group Core Network and Terminals; 5G System; Location Management Services; Stage 3 (Release 15), 3GPP TS 29.572 v0.0.0 (Jan. 2018) (15 pages).

CATT, "RA-RNTI design," 3GPP Draft; R2-081673, 3rd Generation Partnership Project (3GPP), 3GPP TSG RAN WG2 #61bis, Mar. 31-Apr. 4, 2008, Shenzhen, China (6 pages).

Huawei, "How to report UE location," 3GPP Draft; R3-192731, 3rd Generation Partnership Project (3GPP), 3GPP TSG-RAN WG3 Meeting #104, May 13-17, 2019, Reno, Nevada USA (2 pages).

Nokia et al., "Positioning in NTN," 3GPP Draft; R1-1901721, 3rd Generation Partnership Project (3CPP), 3GPP TSG-RAN WG1 #96, Feb. 25-Mar. 1, 2019, Athens, Greece (5 pages).

Nokia et al., "NTN Requirements for UE Location," 3GPP Draft; R1-1906089, 3rd Generation Partnership Project (3GPP), 3GPP TSG RAN WG1 Meeting #97, May 13-17, 2019, Reno, Nevada USA (6 pages).

Nomor Research GmbH et al., "UE Positioning in NTN," 3GPP Draft; R2-1905905, 3rd Generation Partnership Project (3GPP), 3GPP TSG RAN WG2 Meeting #106, May 13-17, 2019, Reno, Nevada USA (3 pages).

International Search Report & Written Opinion for PCT/EP2020/071847, mailed Nov. 11, 2020 (19 pages).

* cited by examiner

NTN COUNTRY AREA SPECIFIC LOW DELAY ACCESS

This application is a national stage entry of Patent Cooperation Treaty Application No. PCT/EP2020/071847 filed Aug. 4, 2020, entitled "NTN COUNTRY AREA SPECIFIC LOW DELAY ACCESS," which claims priority to U.S. Provisional Application No. 62/887,420 filed on Aug. 15, 2019, entitled "NTN COUNTRY AREA SPECIFIC LOW DELAY ACCESS." The disclosures of which are incorporated herein by reference in their entirety.

FIELD

The subject matter described herein relates to non-terrestrial networks.

BACKGROUND 5G non-terrestrial networks (NTN) refer to satellites providing a radio access network interface to a user equipment (UE) and backhaul connectivity to a 5G core network including access to a data network. The NTN may thus provide a 5G gNB type base station serving a coverage area that may include one or more UEs, some of which may be based terrestrially. As used herein, the term "satellite" refers to space borne platforms as well as airborne.

SUMMARY

In some example embodiment, there may be provided an apparatus including at least one processor and at least one memory including computer program code, the at least one memory and the computer program code configured to, with the at least one processor, cause the apparatus to at least: determine, based on position information, a country where the apparatus is located; receive, from a non-terrestrial base station, a system information broadcast including mapping information, the mapping information including a country area identifier or a random access radio network temporary identifier; map the determined country into the received country area identifier or the received random access radio network temporary identifier; and perform, based on the received country area identifier or the received random access radio network temporary identifier, a random access procedure with the non-terrestrial base station.

In some variations, one or more of the features disclosed herein including the following features can optionally be included in any feasible combination. The random access procedure with the non-terrestrial base station may include a radio resource control connection request message including the country area identifier being sent to the non-terrestrial base station. The random access procedure with the non-terrestrial base station may include a random access channel preamble message including the random access radio network temporary identifier being sent to the non-terrestrial base station. The country area identifier may be assigned to the country and may identify at least one policy for the apparatus seeking access to the non-terrestrial base station including a 5G core network. The random access radio network temporary identifier may be assigned to the country and identifies at least one policy for the apparatus seeking access to the non-terrestrial base station including a 5G core network. The at least one policy may define a rate, defines a quality of service, and/or defines an access restriction. The apparatus may comprise or be comprise in a user equipment.

In some example embodiment, there may be provided an apparatus including at least one processor and at least one memory including computer program code, the at least one memory and the computer program code configured to, with the at least one processor, cause the apparatus to at least: broadcast a system information broadcast including mapping information, the mapping information including a country area identifier or a random access radio network temporary identifier; and perform, with a user equipment, a random access procedure, wherein the random access procedure includes the country area identifier provided by the user equipment as an estimate of a location of the user equipment or the random access radio network temporary identifier provided by the user equipment as the estimate of the location of the user equipment.

In some variations, one or more of the features disclosed herein including the following features can optionally be included in any feasible combination. The random access procedure may include a radio resource control connection request message including the country area identifier being received from the user equipment. The random access procedure may include a random access channel preamble message including the random access radio network temporary identifier being received from the user equipment. The country area identifier may be assigned to the country and may identify at least one policy for the user equipment seeking access to the apparatus including a 5G core network. The random access radio network temporary identifier may be assigned to the country and may identify at least one policy for the user equipment seeking access to the apparatus including a 5G core network. The at least one policy may define a rate, defines a quality of service, and/or defines an access restriction. The country area identifier or the random access radio network temporary identifier provided by the user equipment during the random access procedure may be replaced with an estimate, determined by the apparatus, of a current location of the user equipment. The system information broadcast may include a plurality of country area identifiers or a plurality of random access radio network temporary identifiers in view of the apparatus. The apparatus may comprise or be comprised in a non-terrestrial network base station.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
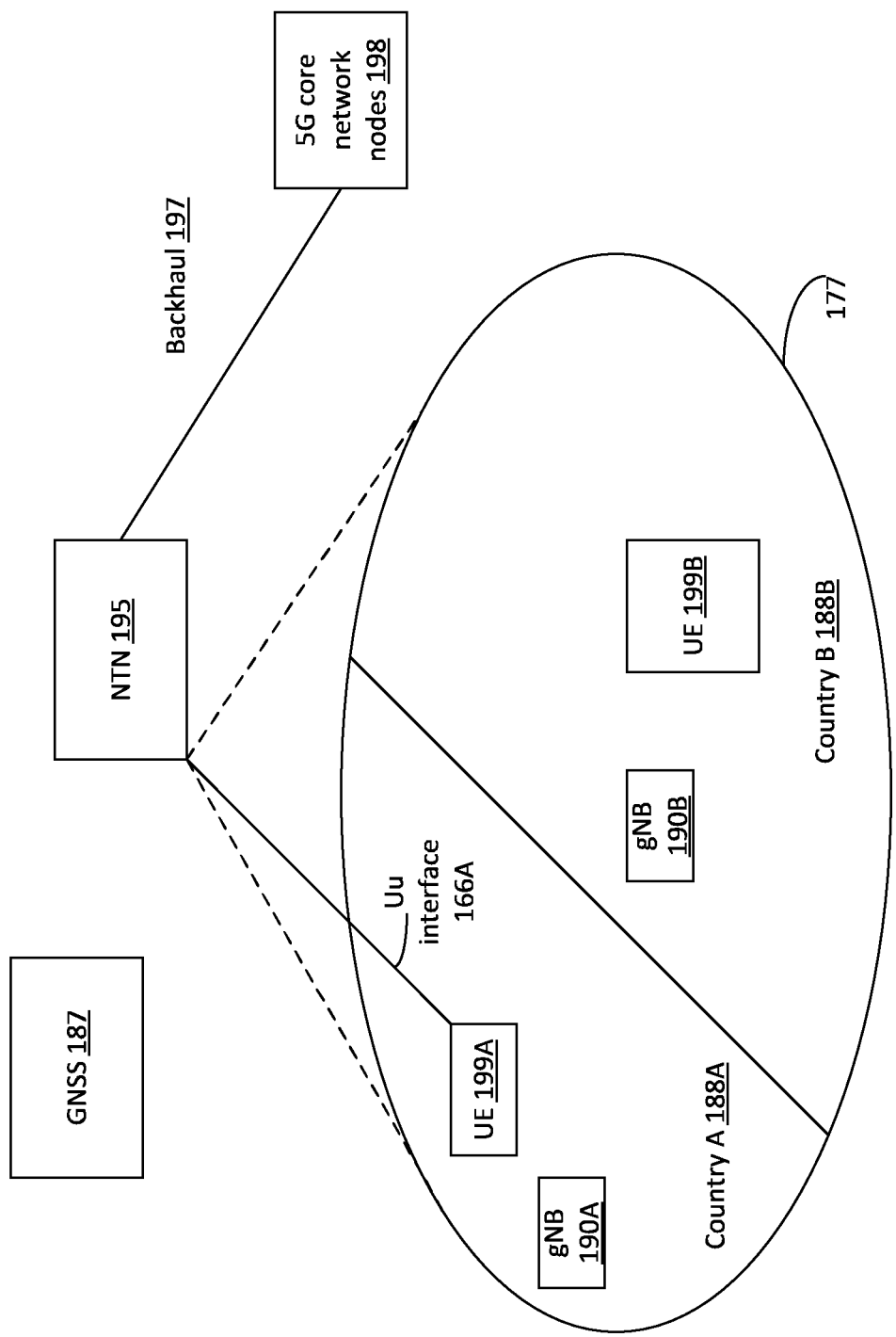
FIG. 1 depicts an example of a portion of non-terrestrial network serving UEs, in accordance with some example embodiments.

Like labels are used to refer to same or similar items in the drawings.

DETAILED DESCRIPTION

In non-terrestrial networks (NTN), one or more satellite networks may provide a cellular coverage area, such as a 5G coverage area including a radio access network (RAN). For example, one or more satellites may provide a base station (e.g., a 5G base station, gNB) serving an area including one or more user equipment (UE). The UE may be configured operate with the NTN's satellites to access the 5G RAN and core. Alternatively or additionally, the UE may be configured to operate over the terrestrial, public land mobile network and access a terrestrial 5G RAN, such as a 5G gNB type base station. In the case of the NTN base station serving as a 5G, gNB base station, it may be coupled to a core network in a manner similar to other gNBs but for the satellite based nature of the NTN's gNB. In the case of these NTN, there may be different deployment scenarios covering different satellite altitudes, such as at a geostationary orbit (GEO), low earth orbit (LEO), and the like. Table 1 below depicts the GEO and LEO deployment scenarios as described in 3GPP TR 38.821.

In the case of the NTN, the satellites may, as noted, be far away from the earth surface, when compared to terrestrial 5G base stations. This distance may lead to significant latency due to the air interface propagation. The coverage area provided by a satellite in NTN may be defined by the area where the elevation angle between a UE and the satellite exceeds 10 degrees. Table 1 below shows the maximum coverable distance for NTN satellites according to the assumptions presented in the 3GPP TR 38.821 and the respective round-trip time latency associated to it. The coverage area of a single satellite beam may be very large and cover several countries. And, these countries may each have different policies including network access policies that apply to the UE as it seeks access to the network including the NTN. As used herein, a policy is used to restrict or define access, by the UE, to certain networks, restrict access to certain web sites, define rates (e.g., cost of access, tariff rates, etc.), define quality of service, and/or restrict or define other types of radio communication service policies.

FIG. 1 depicts an example of a system 100 including an NTN 195 serving one or more UEs 199A-B, in accordance with some example embodiments. The NTN 195 may include one or more gNB type base stations providing a Uu interface 166 to the UEs, such as UE 199A. The NTN's one or more gNBs may provide one or more RANs, serving a coverage area, such as coverage area 177. In the example of FIG. 1, the coverage area 177 covers two countries A-B 188A-B due to the large coverage areas realized by the NTNs, although the coverage area may include more or fewer countries as well. Moreover, the UEs may also be configured to access a terrestrial gNB, such as gNBs 190A-B via a Uu interface in accordance with 3GPP standards. The one or more gNBs at the NTN 195 may couple via a backhaul to other nodes including 5G core network nodes 198. Likewise, the terrestrially-based gNBs 190A-190B may couple via a backhaul to other nodes including 5G core network nodes. One or more nodes of the 5G network nodes may be based terrestrially or in the NTN.

If the UE, such as UE 199A, were to rely on cell ID from the NTN's 195 gNB to determine its location, this may not provide sufficient accuracy to the NTN as the NTN may provide coverage to a plurality of countries, such as countries 188A-B. As such, the NTN's cell ID may not be sufficient to determine the position of the UE and, as such, which country the UE is located in order to determine which country-specific policies should be applied to a UE seeking to access the NTN. As such, a more accurate UE location determination scheme for the UE, such as UE 199A, accessing the NTN 195 is needed, so that the network including the NTN may be able to determine country-specific policies for the UE.

TABLE 1

NTN scenario satellite-earth distance and round trip time

| Scenarios | GEO based non-terrestrial access network (Scenario A and B) | LEO based non-terrestrial access network (Scenario C & D) |
|---|---|---|
| Altitude | 35,786 km | 600 km<br>1,200 km |
| Max distance between satellite and user equipment at min elevation angle | 40,586 km | 1,932 km<br>(600 km altitude)<br>3,131 km<br>(1,200 km altitude) |
| Max Round Trip Delay (propagation delay only) | Scenario A:<br>541.14 ms<br>(service and feeder links)<br>Scenario B:<br>271.57 ms<br>(service link only) | Scenario C:<br>(transparent payload:<br>service and feeder links)<br>25.76 ms (600 km)<br>41.75 ms (1200 km)<br>Scenario D: (regenerative payload: service link only)<br>12.88 ms (600 km)<br>20.87 ms (1200 km) |

In some example embodiments, there is provided a way to determine what country a UE (coupled to the NTN) is located such that the policy can be determined for the UE seeking to access the NTN, and the determined policy may be applied as part of the random access procedure used when the UE accesses the NTN. The random access procedure may include the UE sending a RACH preamble (which may include a RA-RNTI) towards the gNB (e.g., message 1); the gNB may then respond with a random access response (RAR) message (e.g., message 2); the UE may then send to the gNB a RRC connection request message (e.g., message 3); and the gNB may respond with an RRC connection setup message (e.g., message 4).

Figure 2:
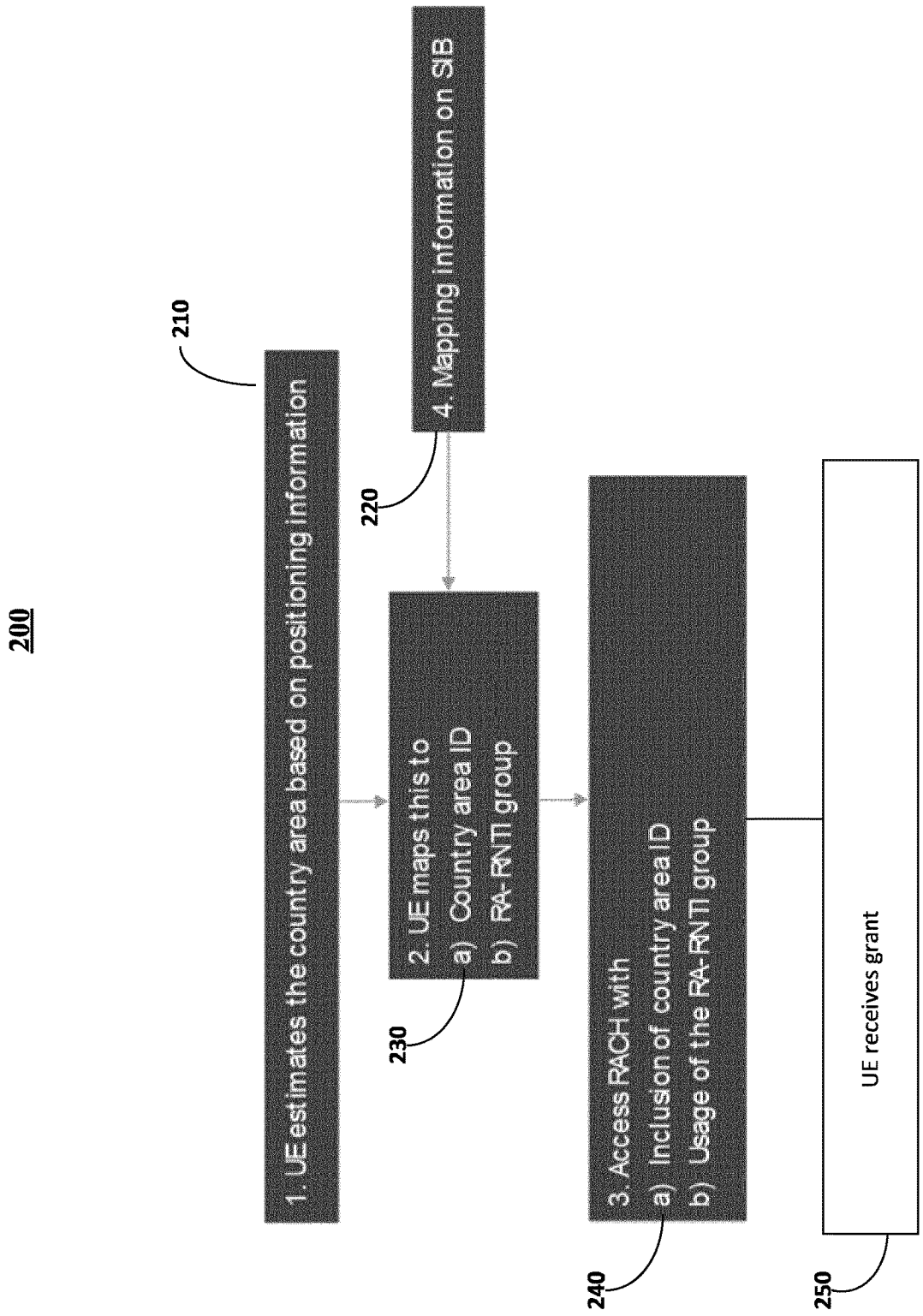
FIG. 2 depicts an example of a process for NTN access, in accordance with some example embodiments.

FIG. 2 depicts an example of a process 200 for country-specific policy selection, in accordance with some example embodiments. The description of FIG. 2 also refers to FIG. 1.

In some example embodiments, the UE's 199A initial access, during the random access procedure, to the NTN 195 includes country information about the country, group of countries, or a geographical area in which the UE is located. This country information may enable the network including the NTN 195 to apply the country or area specific policy at the outset of the UE's connection request and establishment procedure between the UE and the NTN.

At 210, the UE 199A may estimate the country where the UE is located based on available positioning information, in accordance with some example embodiments. For example, the UE may receive available position information. The available position information may include GNSS information, cell ID, and/or any other source of information indicating location or country. For example, the UE 199A may include circuitry to estimate its position information, receive the positioning information from the GNSS 187, receive the positioning information (e.g., country, cell ID, etc.) from another base station such as gNB 190A, and/or other sources of positioning information from which the country where the UE is located may be derived. The granularity of the positioning information may be at least sufficient to determine a country or group of countries in which the UE is located.

At 220, the UE 199A may receive from the NTN 195 a SIB including mapping information, in accordance with some example embodiments. For example, the UE may read the SIB transmitted by the network including the NTN 195, which includes mapping information. This mapping information may include a country area ID, such as an identifier for a country, group of countries, or region. For example, country A 188A may have a first country area ID, while country B 188B may have a second country area ID. These as well as other country area IDs may be broadcast by the NTN via a SIB. Moreover, as the NTN moves across the sky and covers different or additional countries, the SIB may include country area IDs for these countries as well. The country area ID enables the network including NTN 195 to identify the proper policies for the UE given the country where the UE is currently located. As noted, the country area ID may represent a group of countries or region, especially when the countries or regions have the same or similar policies for UEs accessing the network including NTN.

Alternatively or additionally, the mapping information (which is included in the SIB) may at least one random access radio network temporary identifier's (RA-RNTI) that is assigned (or is specific) to a country (or group of countries or region). The RA-RNTI may be used by the UE during the RACH access with the NTN 195. For example, country A 188A may have a first RA-RNTI that the NTN 195 recognizes as country A, while country B 188B may have a second RA-RNTI that the NTN 195 recognizes as the country B. Moreover, as the NTN moves across the sky and covers different or additional countries, the SIB may include RA-RNTIs assigned to these countries as well. In some example embodiments, the network may assign a range of RA-RNTIs to a country (or group of countries or region sharing the same or similar policies) to enable detecting the UE's country location during the random access procedure.

In the case of the RA-RNTIs for example, the network including the NTN may divide the RA-RNTI values into x groups (e.g., RA-RNTI country area groups), wherein x is the number of countries with different policies under the coverage area of a given satellite gNB. If a group of countries has the same policy, they can use the same RA-RNTI country area group.

Now that the UE 199A knows the country where it is positioned and knows the mapping information for the country, the UE may, at 230, map to the country area ID or the RA-RNTI, in accordance with some example embodiments. For example, UE 199A may estimate its position as country A 188A and then map into the country ID provided in the mapping information received via SIB at 220. This mapping may be into a country area ID or a RA-RNTI for country A. In either case, the country area ID or a RA-RNTI are assigned (e.g., mapped) to country A, such that when the UE 199A forwards the country area ID or a RA-RNTI during the random access procedure the NTN 195 can detect the country where the UE is located and the proper policy for that UE. If UE 199A travels to country B, it would instead map to the country area ID or RA-RNTI mapped to country B, for example.

At 240, the UE, such as UE 199A, may perform a random access procedure with the NTN 195 using the country area ID or the RA-RNTI, in accordance with some example embodiments. As part of the random access procedure for example, the UE may send to the NTN 195 an RRC connection request message (e.g., message 3 noted above), which includes the country area ID. Alternatively or additionally, as part of the random access procedure for example, the UE may send to the NTN 195 the RA-RNTI (e.g., message 1 noted above), which is assigned or identifies the country the UE is located in.

At 250, the UE may receive a response, such as a connection setup message including a network grant based on the country information provided by UE 199A, in accordance with some example embodiments. In this way, the network including the NTN and/or core 5G network may apply the policy to the UE's access.

Figure 3:
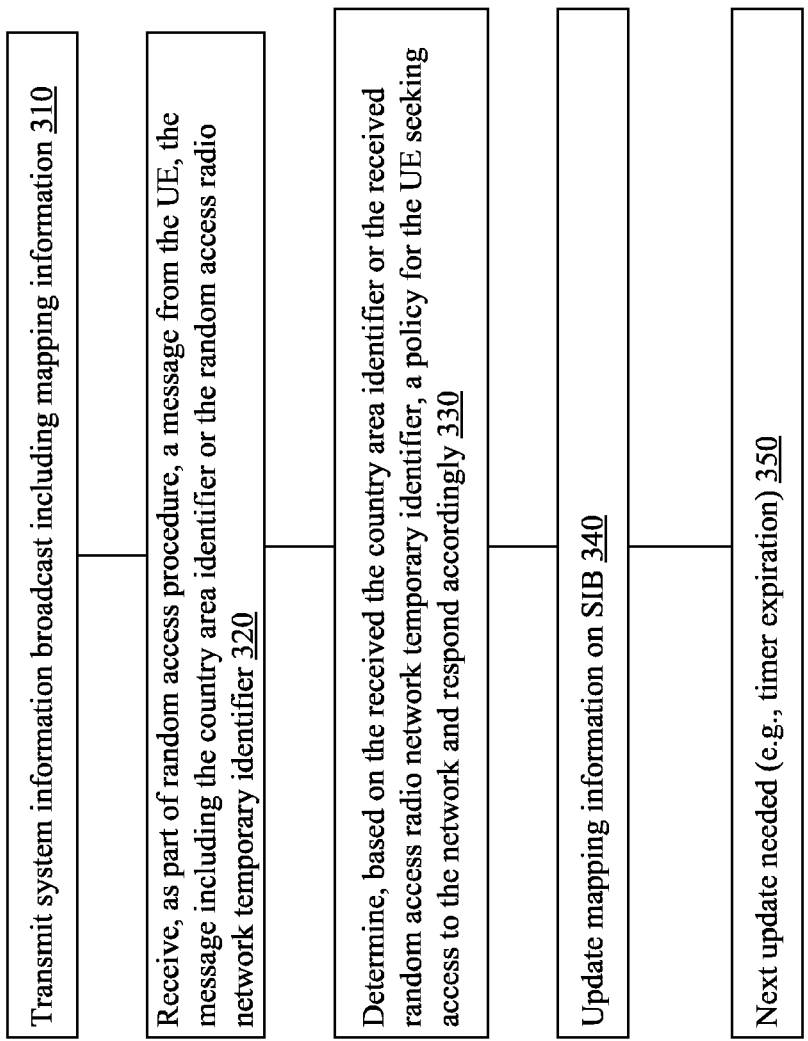
FIG. 3 depicts an example of a process at the NTN access for granting UE access, in accordance with some example embodiments.

FIG. 3 depicts an example of a process 300, in accordance with some example embodiments.

At 310, the NTN may broadcast as system information broadcast including mapping information, in accordance with some example embodiments. The mapping information may include a country area identifier or a random access radio network temporary identifier. Referring to FIG. 1, the NTN 195 may broadcast a SIB that includes country area IDs for country A, country B, and so forth. This allows the UE 199A to map its current location into a proper country area ID as noted above. Likewise, the NTN 195 may broadcast a SIB that includes RA-RNTIs mapped to country A, RA-RNTIs mapped to country B, and so forth. This allows the UE 199A to map its current location into a proper RA-RNTI as noted above.

At 320, the NTN may receive from the UE a message including a country area identifier or a random access radio network temporary identifier, in accordance with some example embodiments. As part of the random access procedure for example, the NTN may receive from the UE an RRC connection request message (e.g., message 3 noted above), which includes the country area ID where the UE is located. Alternatively or additionally, as part of the random access procedure for example, the NTN may receive from the UE the RA-RNTI (e.g., message 1 noted above), which is assigned or identifies the country the UE is located in.

At 330, the NTN may determine the policy for the UE seeking access to the network and respond, based on the determined policy. As noted, this response may be a network access grant based on the policy determined using the country area identifier or the random access radio network temporary identifier provided by the UE during the random access procedure.

The network may group one or more countries into country area groups which, as noted, share the same or similar policy for UEs accessing the network including the NTN 195. The network may also include mapping information that enables a translation from a position or area (e.g., an area or position associated with at least one country) to a country area ID. Alternatively or additionally, the network may also include mapping information that enables a translation from a position or area (e.g., an area or position associated with at least one country) to a specific RA-RNTI or range of RA-RNTIs for that country or group of countries. As noted, the NTN may broadcasts this mapping information in a SIB.

At 340, the network may update the mapping information transmitted by the SIB as the NTN's coverage area changes as the satellite moves across countries, in accordance with some example embodiments. As noted, the NTN may cover one portion of the Earth at one point in time, and later cover another portion. As such, the SIB may update its broadcast to transmit the mapping information for the countries currently in view of the NTN's satellite (e.g., within the footprint or beam of the satellite).

At 350, the network may perform an update. For example, the update may relate to updating the network with the current country associated with a UE, such as in the case of UE 199A traveling from country A to country B. In some example embodiments, a timer may be used, and this timer may be related to potential movement of the UE. The timer may be specific to a UE's position, speed, velocity, and/or direction of travel (e.g., the timer may have a value that would expire for a UE at time t, when the UE is expected to enter country B based on velocity of travel, etc.).

Figure 4:
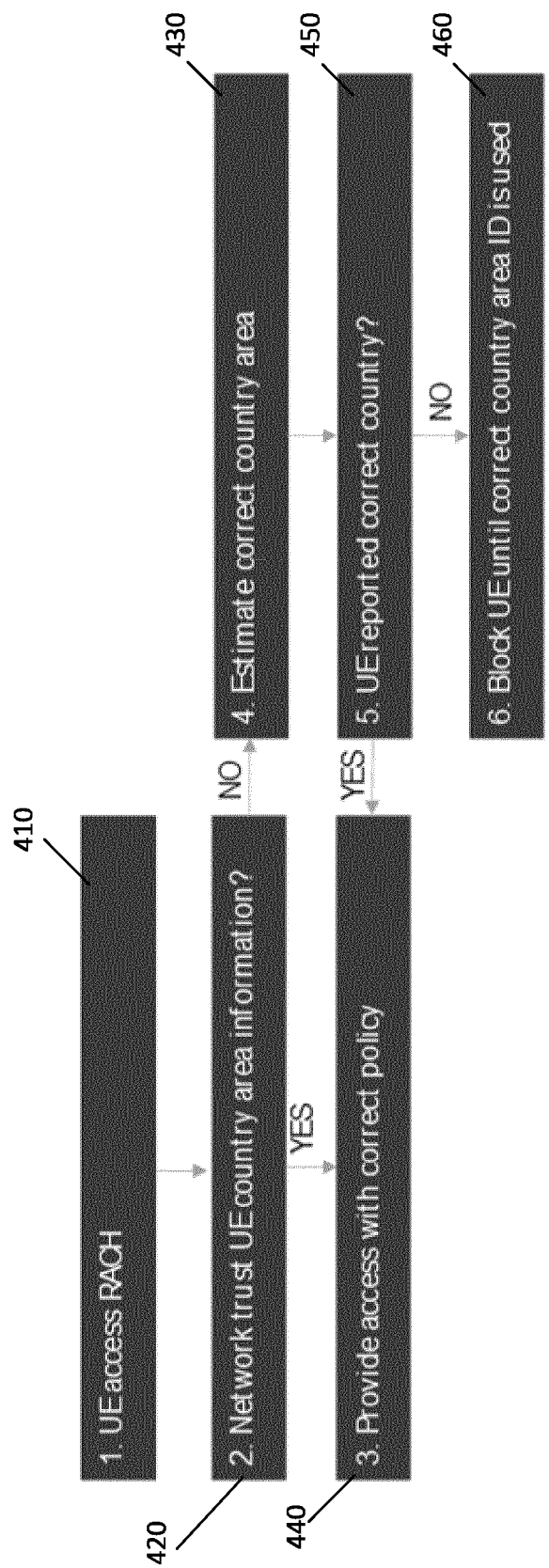
FIG. 4 depicts another example of a process for NTN access, in accordance with some example embodiments.

FIG. 4 depicts an example of a process 400, in accordance with some example embodiments. In some example embodiments, the network may check the UE's position from time to time to confirm the accuracy of the UE reported country area ID or RA-RNTI for a given country. If there is some reason to not trust the UE's self-reported location (e.g., the UE has provided fake or false information in the past or the UE is in a highly mobile state, etc.), the network may trigger network based location and check if the country area ID or RA-RNTI reported by the UE is correct. If it is not correct, the network may take an action, such as block network access.

When the UE accesses the network at 410 (as noted at 240 above, for example), the NTN (which may include the core network) may check, at 420, if the UE's country area ID and/or RA-RNTI for the country can be trusted. If the network trusts the UE's country area ID and/or RA-RNTI, the network grants access at 440 (see, e.g., 250 above). If the network does not trust the UE's country area ID and/or RA-RNTI, the network may at 430 estimate the UE's actual location. If the UE's country area ID and/or RA-RNTI is correct (450) based on the network's estimate, the UE is granted access at 440. If not, the network blocks the UE access at 460.

To perform trust checks at 420, a timer (e.g., T_verification) may be used. For example, at time t1, the network may check if the UE uses the correct country area ID or RA-RNTI given the UE's current location. If the UE is using the uses the correct country area ID or RA-RNTI, the network may set, based on the past information (e.g., the location of the UE, the speed, the class, etc.) a time duration for how long the UE's reported country area ID or RA-RNTI can be trusted as valid. For example, a UE at a border have a small timer value set, when compared to a UE that is in the middle of a large country.

In some example embodiments, the network (e.g., the gNB or core network) may disregard the UE's self-reported country area ID or RA-RNTI, and replace the country area ID or RA-RNTI with the network's estimate of the UE's correct country area ID or RA-RNTI.

Figure 5:
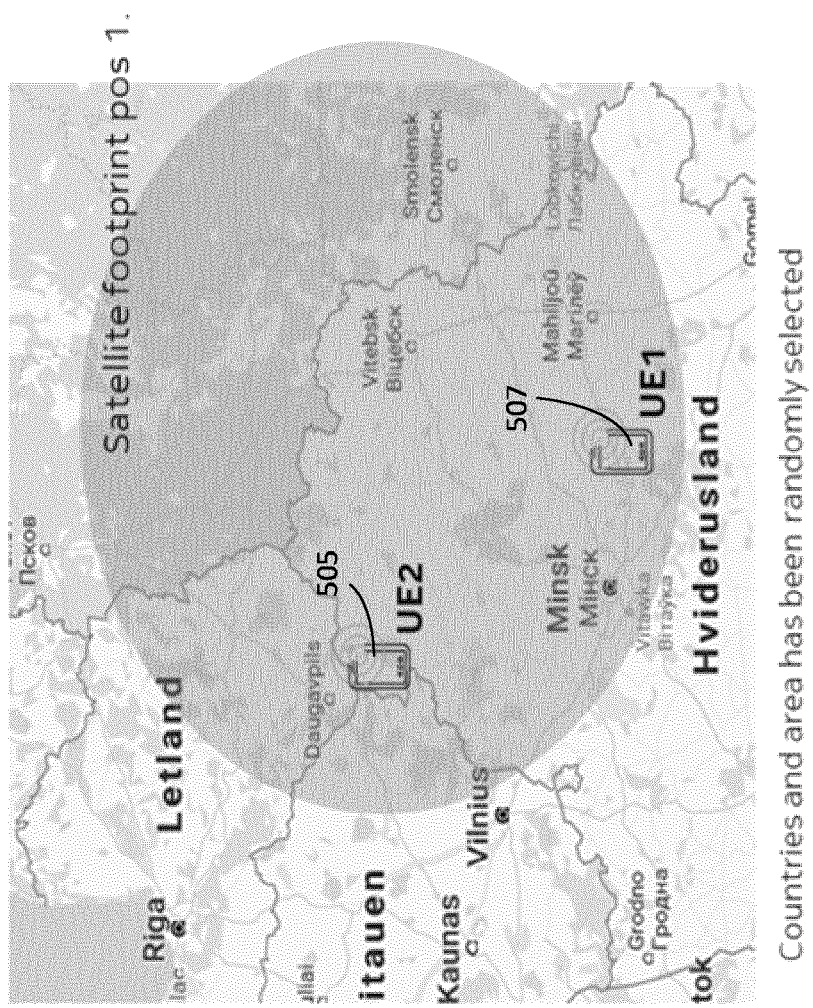
FIG. 5 depicts an example of an NTN coverage area, in accordance with some example embodiments.

FIG. 5 depicts UE1 505 and UE2 507, in accordance with some example embodiments. In the example of FIG. 5, Hviderusland has a different NTN access policy compared to the neighboring countries. In this example, the RA-RNTI country group 1 is used for Hviderusland access. The UE1 has been identified by network positioning (GNSS, network based or a combination of those) to be in Hviderusland and as it is far from the border, the timer T_verification is set to 1 hour. The UE2 is also identified in Hviderusland but as it is close to the border T_verification is set to 5 min only. When the satellite moves and the coverage area indicated moves, the RA-RNTI country group size needs to be changed to reflect the number of potential initial radio access from the different geographical areas under the satellite gNB footprint.

The RA-RNTI associated with the PRACH occasion in which the random access preamble is transmitted, may be computed as follows:

$$RA\text{-}RNTI = 1 + s\_id + 14 \times t\_id + 14 \times 80 \times f\_id + 14 \times 80 \times 8 \times ul\_carrier\_id,$$

wherein s_id is the index of the first OFDM symbol of the PRACH occasion ($0 \leq s\_id < 14$), t_id is the index of the first slot of the PRACH occasion in a system frame ($0 \leq t\_id < 80$), where the subcarrier spacing to determine t_id is based on the value of μ specified in subclause 5.3.2 in TS 38.211, f_id is the index of the PRACH occasion in the frequency domain ($0 \leq f\_i < 8$), and ul_carrier_id is the UL carrier used for random access preamble transmission (0 for NUL carrier, and 1 for SUL carrier).

A way of forming RA-RNTI country groups is to divide the symbol s_id or slot t_id space in groups (e.g., if two groups are needed odd symbols (s_id=1, 3, 5, . . . ) belong to group A, while group B is identified through RA preambles sent in even symbols (s_id=0, 2, 4, . . . )). Similarly, the slot t_id can be used to divide the groups. The actual division of the groups is left for implementation, but interleaving in time and frequency is one option while block division is another.

As noted, the RA-RNTI country groups need to be updated regularly in order to match the coverage of moving satellite (e.g., the cell coverage moves across borders). For example, the RA-RNTI space may be divided into a number of country groups (not necessary equally large) and always have 1-2 extra groups compared to the number of country area's in the cell coverage. Every country area gets its own group until the country area is not in the coverage are of the cell. The reserved groups are for the potential new country area's which come into the cell coverage. Once a country area has left the coverage of the cell, it moves to the reserved space.

Table 2 provides an illustration of how the country group IDs are allocated over time. At time T0 the satellite provides coverage for Denmark, Germany, Poland and Sweden. Since Germany and Poland have many users they are assigned two IDs, 2-3 and 4-5, respectively. In this example, ID 7 is not in use. At time T1 the satellite moves East and Denmark is no longer covered and thus ID 1 is unused. Since the satellite is now covering a larger part of Poland, ID 7 is also allocated to this country. Finally, at time T2 the satellite no longer provides coverage in Germany and IDs 2-3 are freed. Furthermore, after a grace-period where UEs originally located in Denmark, and thus using ID 1, have had time to read the updated country group IDs, ID 1 is reallocated to Lithuania, which is now covered.

TABLE 2

Illustration of the country group IDs are changed over time.

| Country group ID | Countries covered |
|---|---|
| T0 | |
| 1 | Denmark |
| 2 | Germany |
| 3 | Germany |
| 4 | Poland |
| 5 | Poland |
| 6 | Sweden |
| 7 | n/a |
| T1 | |
| 1 | n/a |
| 2 | Germany |
| 3 | Germnay |
| 4 | Poland |
| 5 | Poland |
| 6 | Sweden |
| 7 | Poland |
| T2 | |
| 1 | Lithuania |
| 2 | n/a |
| 3 | n/a |
| 4 | Poland |
| 5 | Poland |
| 6 | Sweden |
| 7 | Poland |

Alternatively or additionally, the UEs may be forced to read the SIB frequently (in area's where this is needed) by use of the System Information change indication (see, e.g., TS 38.331) and update according to this interval. In order to avoid mismatches, safety margins may be used between the groups which ideally match with the frequency UEs are reading the SIB.

Figure 6:
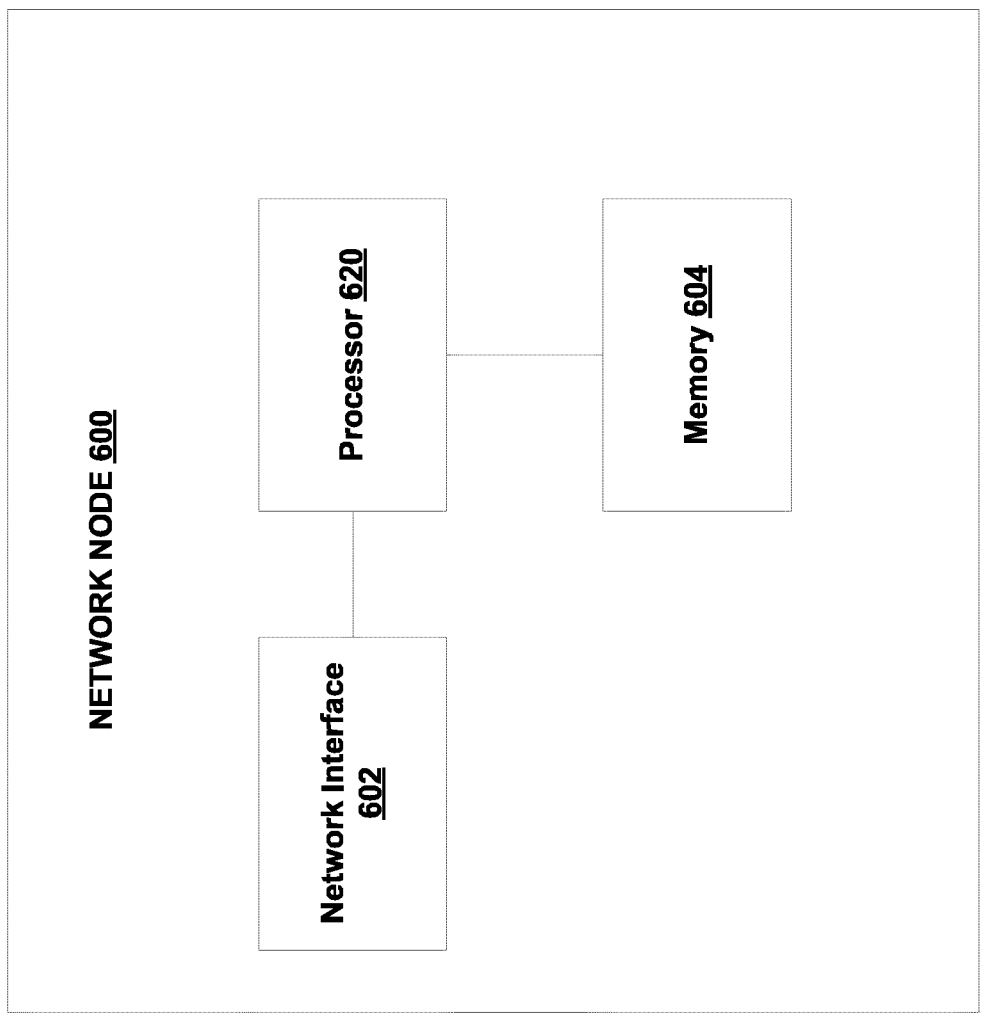
FIG. 6 depicts an example of a network node, in accordance with some example embodiments.

FIG. 6 depicts a block diagram of a network node 600, in accordance with some example embodiments. The network node 600 may be configured to provide one or more network side functions, such as a base station (e.g., gNB) and/or other network nodes. For example, the NTN gNB may be configured to at least: broadcast a system information broadcast including mapping information, the mapping information including a country area identifier or a random access radio network temporary identifier; and perform, with a user equipment, a random access procedure, wherein the random access procedure includes the country area identifier provided by the user equipment as an estimate of a location of the user equipment or the random access radio network temporary identifier provided by the user equipment as the estimate of the location of the user equipment.

The network node 600 may include a network interface 602, a processor 620, and a memory 604, in accordance with some example embodiments. The network interface 602 may include wired and/or wireless transceivers to enable access other nodes including base stations, the Internet, and/or other nodes. The memory 604 may comprise volatile and/or non-volatile memory including program code, which when executed by at least one processor 620 provides, among other things, the processes disclosed herein with respect to the network node.

Figure 7:
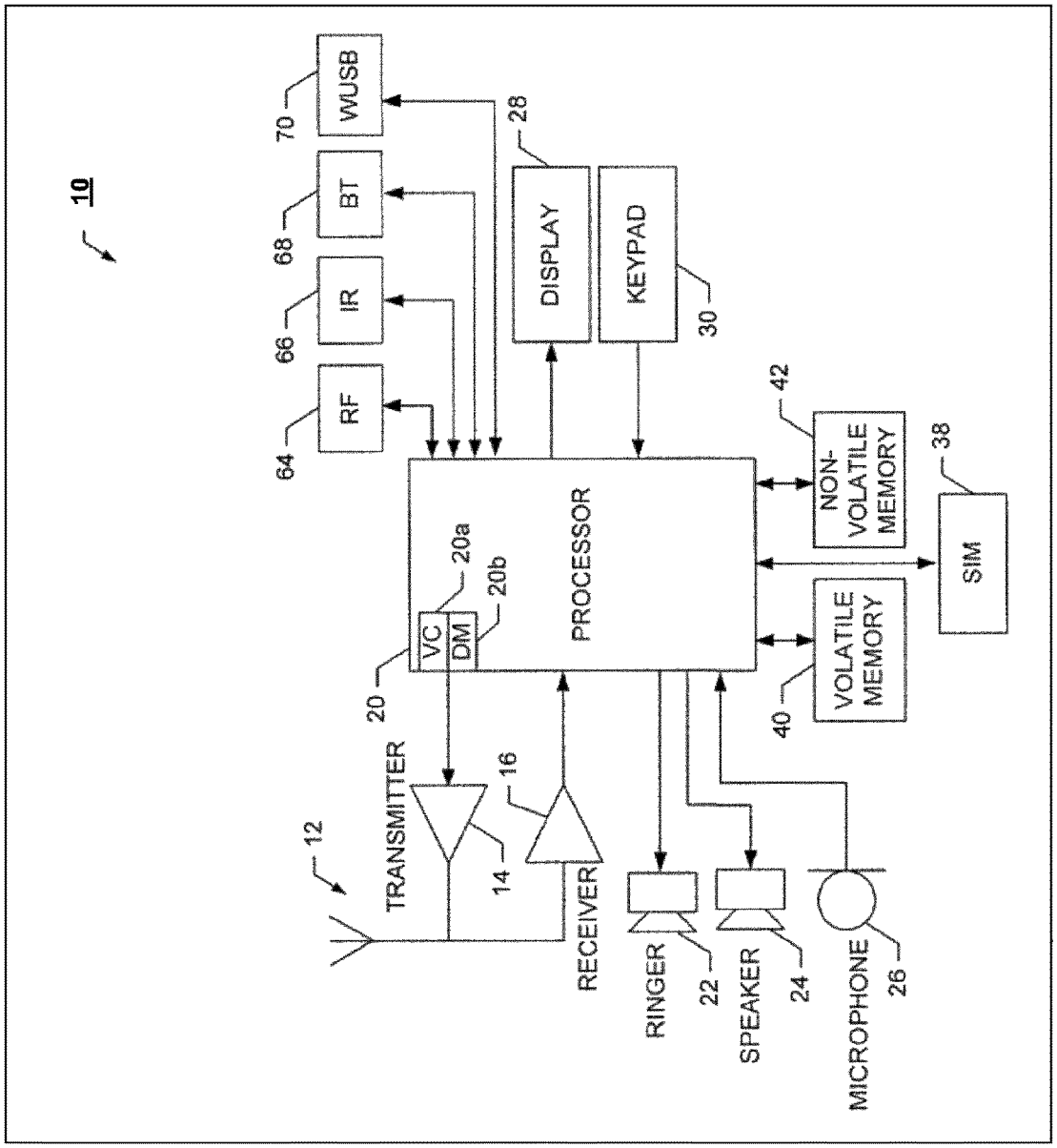
FIG. 7 depicts an example of an apparatus, in accordance with some example embodiments.

FIG. 7 illustrates a block diagram of an apparatus 10, in accordance with some example embodiments. The apparatus 10 may comprise or be comprised in a user equipment. In some example embodiments, the UE may at least determine, based on position information, a country where the apparatus is located; receive, from a non-terrestrial base station, a system information broadcast including mapping information, the mapping information including a country area identifier or a random access radio network temporary identifier; map the determined country into the received country area identifier or the received random access radio network temporary identifier; and perform, based on the received country area identifier or the received random access radio network temporary identifier, a random access procedure with the non-terrestrial base station.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 7 as a single processor, in some example embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA 2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 7, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein. Alternatively or additionally, the apparatus may be configured to cause the operations disclosed herein with respect to the base stations/WLAN access points and network nodes including the UEs.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to the provide operations disclosed herein with respect to the UE.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 7, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein may be enhanced operations of NTN.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. An apparatus comprising:
   at least one processor; and
   at least one memory including computer program code,
      the at least one memory and the computer program code configured to, with the at least one processor, cause the apparatus to at least:
      determine, based on position information, a country where the apparatus is located;
      receive, from a non-terrestrial base station, a system information broadcast including mapping information, the mapping information including a country area identifier and a random access radio network temporary identifier;
      map the determined country into the received country area identifier and the received random access radio network temporary identifier; and
      perform, based on the received country area identifier and the received random access radio network temporary identifier, a random access procedure with the non-terrestrial base station,
   wherein the random access procedure with the non-terrestrial base station comprises a radio resource control connection request message including the country area identifier being sent to the non-terrestrial base station and a random access channel preamble message including the random access radio network temporary identifier being sent to the non-terrestrial base station.

2. The apparatus of claim 1 wherein the country area identifier is assigned to the country and identifies at least one policy for the apparatus seeking access to the non-terrestrial base station including a 5G core network.

3. The apparatus of claim 2, wherein the at least one policy defines a rate, defines a quality of service, and defines an access restriction.

4. The apparatus of claim 1, wherein the random access radio network temporary identifier is assigned to the country and identifies at least one policy for the apparatus seeking access to the non-terrestrial base station including a 5G core network.

5. The apparatus of claim 1, wherein the apparatus comprises or is comprised in a user equipment.

6. An apparatus comprising:
   at least one processor; and
   at least one memory including computer program code,
      the at least one memory and the computer program code configured to, with the at least one processor, cause the apparatus to at least:
      broadcast a system information broadcast including mapping information, the mapping information including a country area identifier and a random access radio network temporary identifier; and
      perform, with a user equipment, a random access procedure, wherein the random access procedure includes at least the country area identifier provided by the user equipment as a first estimate of a location of the user equipment and the random access radio network temporary identifier provided by the user equipment as a second estimate of the location of the user equipment,
   wherein the random access procedure comprises a radio resource control connection request message including the country area identifier being received from the user equipment and a random access channel preamble message including the random access radio network temporary identifier being received from the user equipment.

7. The apparatus of claim 6, wherein the country area identifier is assigned to the country and identifies at least one policy for the user equipment seeking access to the apparatus including a 5G core network.

8. The apparatus of claim 7, wherein the at least one policy defines a rate, defines a quality of service, and defines an access restriction.

9. The apparatus of claim 6, wherein the random access radio network temporary identifier is assigned to the country and identifies at least one policy for the user equipment seeking access the apparatus including a 5G core network.

10. The apparatus of claim 6, wherein the apparatus is further caused to at least replace the country area identifier or the random access radio network temporary identifier provided by the user equipment during the random access procedure with an estimate, determined by the apparatus, of a current location of the user equipment.

11. The apparatus of claim 6, wherein the system information broadcast includes a plurality of country area identifiers and a plurality of random access radio network temporary identifiers in view of the apparatus.

12. The apparatus of claim 6, wherein the apparatus comprises or is comprised in a non-terrestrial network base station.

13. The apparatus of claim 6, wherein the apparatus is further caused to at least allow or reject user equipment access to a network based on an accuracy of the country area identifier and the random access radio network temporary identifier.

14. The apparatus of claim 6, wherein the apparatus is further caused to at least set a timer during which the country area identifier and the random access radio network temporary identifier is trusted as valid.

15. The apparatus of claim 6, wherein the apparatus is further caused to:
check the user equipment's position periodically to determine an accuracy of the country area identifier and the random access radio network temporary identifier information as reported by the user equipment;
when it is determined that the user equipment's self-reported information may not be accurate, trigger network based location and check if the country area identifier and the radio network temporary identifier reported by the user equipment are correct;
when it is determined that the country area identifier and the radio network temporary identifier information reported by the user equipment is not correct, block network access.

16. A method comprising:
determining, based on position information, a country where a user equipment is located;
receiving, from a non-terrestrial base station, a system information broadcast including mapping information, the mapping information including a country area identifier and a random access radio network temporary identifier;
mapping the determined country into the received country area identifier and the received random access radio network temporary identifier; and
performing, based on the received country area identifier and the received random access radio network temporary identifier, a random access procedure with the non-terrestrial base station,
wherein the random access procedure with the non-terrestrial base station comprises a radio resource control connection request message including the country area identifier being sent to the non-terrestrial base station and a random access channel preamble message including the random access radio network temporary identifier being sent to the non-terrestrial base station.

* * * * *